J. KNIGHT.
STRAINER.
APPLICATION FILED MAR. 22, 1916.
1,183,468.
Patented May 16, 1916.
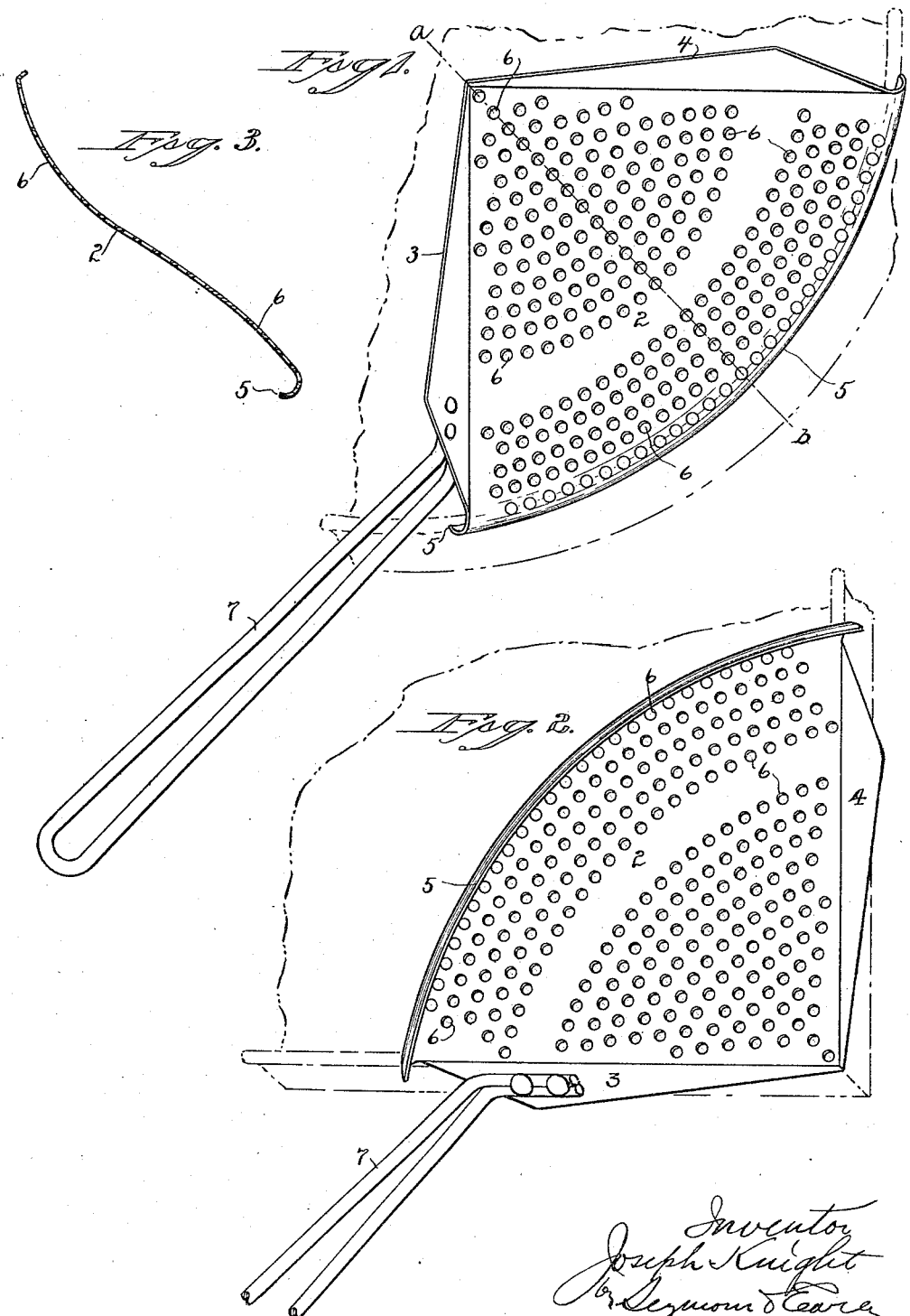

UNITED STATES PATENT OFFICE.

JOSEPH KNIGHT, OF NEW HAVEN, CONNECTICUT.

STRAINER.

1,183,468. Specification of Letters Patent. Patented May 16, 1916.

Application filed March 22, 1916. Serial No. 85,835.

*To all whom it may concern:*

Be it known that I, JOSEPH KNIGHT, a citizen of the United States, residing at New Haven, in the county of New Haven and State of Connecticut, have invented a new and useful Improvement in Strainers; and I do hereby declare the following, when taken in connection with the accompanying drawings, and the characters of reference marked thereon, to be a full, clear, and exact description of the same, and which said drawings constitute part of this application.

This invention relates to an improvement in strainers for household use, the object being to provide a strainer adapted to fit either a round vessel or one with square corners; and the invention consists in the construction hereinafter described and particularly recited in the claims.

In the accompanying drawings, Figure 1 is a plan view of my improved strainer shown in connection with a round vessel. Fig. 2 is a reverse plan view of the same showing it in position for use in connection with a vessel having square corners. Fig. 3 is a sectional view on the line $a$—$b$ of Fig. 1.

In carrying out my invention, I form a strainer from a plate 2 of metal bent to form flanges 3 and 4 at right angles to each other. The edge between the outer ends of the flanges is curved and rolled in the opposite direction forming a curved lip 5, and the plate 2 is perforated as at 6 to any desired extent. To one of the flanges herein shown as 3, a handle 7 is attached by which the strainer may be conveniently held.

In Fig. 1 of the drawings I have illustrated the strainer as applied to a round vessel in which case the lip 5 is hooked over the edge of the vessel so that as the vessel is tipped the liquid may escape through the perforations 6, the solid contents in the vessel being held back by the strainer. In case of use with a vessel having square corners, the device is reversed as shown in Fig. 2 of the drawings, in which case the flanges 3 and 4 pass outside the edges of the vessel and so as to close one corner, allowing the liquid contents to escape through the strainer. The flanges 3 and 4 form a support for the vessel when the contents are being poured off, and the same is true in the case of a round vessel the lip acting as a support.

Preferably and as shown in Fig. 3 of the drawings the plate will be depressed between the flanges 3 and 4 and so that the device may be used as a strainer independent of the vessel with which it is used, that is to say, the strainer may be used without bringing into supporting function the flanges 3 and 4 or the lip 5.

I claim:—

1. A strainer comprising a plate provided with flanges arranged at right angles to each other the edge of the plate between the outer ends of the flanges curved forming a lip projecting beyond the face of the strainer on the side reverse to the said flanges.

2. A strainer comprising a perforated plate formed with two flanges arranged at right angles to each other, the edge of the plate between the outer ends of the flanges curved forming a retaining lip, and a handle connected with said plate.

JOSEPH KNIGHT.

Copies of this patent may be obtained for five cents each, by addressing the "Commissioner of Patents, Washington, D. C."